(12) United States Patent
Pastrana

(10) Patent No.: US 10,664,617 B2
(45) Date of Patent: May 26, 2020

(54) EMBEDDING PINS INTO IDENTIFICATION AND CREDIT CARD NUMBERS TO ENCRYPT USER'S CARDS

(71) Applicant: Joseph Carlo Pastrana, Hampton, VA (US)

(72) Inventor: Joseph Carlo Pastrana, Hampton, VA (US)

( * ) Notice: Subject to any disclaimer, the term of this patent is extended or adjusted under 35 U.S.C. 154(b) by 0 days.

(21) Appl. No.: 16/159,162

(22) Filed: Oct. 12, 2018

(65) Prior Publication Data

US 2019/0114448 A1  Apr. 18, 2019

Related U.S. Application Data

(60) Provisional application No. 62/571,864, filed on Oct. 13, 2017.

(51) Int. Cl.
| | | |
|---|---|---|
| *H04L 29/06* | (2006.01) | |
| *G06F 21/62* | (2013.01) | |
| *H04L 9/32* | (2006.01) | |
| *G06F 21/60* | (2013.01) | |
| *G06F 21/31* | (2013.01) | |
| *H04L 9/38* | (2006.01) | |

(52) U.S. Cl.
CPC ......... *G06F 21/6254* (2013.01); *G06F 21/31* (2013.01); *G06F 21/602* (2013.01); *G06F 21/6209* (2013.01); *H04L 9/3226* (2013.01); *H04L 9/38* (2013.01)

(58) Field of Classification Search
CPC .... G06F 21/6254; G06F 21/31; G06F 21/602; G06F 21/6209; H04L 9/3226; H04L 9/38
See application file for complete search history.

(56) References Cited

U.S. PATENT DOCUMENTS

| | | | | |
|---|---|---|---|---|
| 4,218,738 A * | 8/1980 | Matyas | ................... | G06F 21/31 340/5.26 |
| 4,438,824 A * | 3/1984 | Mueller-Schloer | ........................... | H04L 9/3226 713/185 |
| 9,736,147 B1 * | 8/2017 | Mead | ..................... | H04L 63/083 |
| 2006/0070125 A1 * | 3/2006 | Pritchard | ................ | G06F 21/31 726/18 |
| 2006/0136740 A1 * | 6/2006 | Smith | ..................... | G06F 21/31 713/184 |
| 2007/0057037 A1 * | 3/2007 | Woronec | ................ | G06Q 20/24 235/380 |
| 2007/0240230 A1 * | 10/2007 | O'Connell | ............. | G06F 21/55 726/28 |
| 2010/0243741 A1 * | 9/2010 | Eng | ...................... | G06K 19/005 235/487 |
| 2012/0259877 A1 * | 10/2012 | Raghunathan | ...... | G06F 21/6254 707/757 |
| 2013/0061310 A1 * | 3/2013 | Whitmyer, Jr. | ..... | H04L 63/0281 726/9 |
| 2013/0160098 A1 * | 6/2013 | Carlson | ................... | G06F 21/45 726/6 |
| 2013/0312083 A1 * | 11/2013 | Farraro | ............... | G06F 3/04883 726/16 |
| 2014/0013452 A1 * | 1/2014 | Aissi | ..................... | G06F 21/604 726/30 |
| 2017/0093812 A1 * | 3/2017 | Schenk | ................ | G06Q 20/401 |
| 2017/0180986 A1 * | 6/2017 | Mohan | ................ | G06F 16/9535 |

* cited by examiner

*Primary Examiner* — Ghodrat Jamshidi

(57) ABSTRACT

An encryption method to protect the identification and account constructs displayed on cards, like identification cards and credit cards, or on paper medium like hospital or bank statements, where these constructs are comprised of numbers, and/or characters, and/or symbols and where the encryption method works by replacing some of the elements comprising the account construct with a special symbol(s) to avoid revealing the entire construct to unauthorized people and where the numbers and/or characters replaced by the special symbol(s) represent the personal identification number (PIN) associated with the construct. The method is designed to be utilized by issuers of cards like hospitals, governments and banks, and used as a process to protect the cardholder account information or account statements on paper medium. To provide the entire construct, the user simply replaces the special symbol(s) with his PIN. Without the PIN, a person will not be able to complete the construct.

3 Claims, No Drawings

EMBEDDING PINS INTO IDENTIFICATION AND CREDIT CARD NUMBERS TO ENCRYPT USER'S CARDS

CROSS-REFERENCE TO RELATED APPLICATIONS

Not applicable to this application

FEDERALLY SPONSORED RESEARCH OR DEVELOPMENT

Not applicable to this application

SEQUENCE LISTING, A TABLE, OR A COMPUTER PROGRAM LISTING

Not applicable to this application

COMPACT DISC APPENDIX

Not applicable to this application

STATEMENT REGARDING PRIOR DISCLOSURES BY THE INVENTOR

Not applicable to this application

BACKGROUND OF THE INVENTION

The technical field of the invention relates to the security of information found integrated on credit cards, identification cards and on paper medium like hospital or bank statements. More particularly, the present invention relates to the field of personal information/data protection currently displayed on credit cards and identification cards as well as on printed bank statements, hospital documents, or government documents. When a person obtains a credit card or a document with sensitive personal data from a business or government, a person is constantly trying safeguard his/her personal information, whether at home, at work, or in some other location. This effort is endless and always required. For example, to secure personal information, some hospital, business and government agencies are providing printed documents with incomplete account numbers or incomplete information to protect people's personal information. However, credit card numbers, identification and other personal data still being completely displayed in many of the abovementioned documents and cards.

The abovementioned method and other methods still unable to avoid security problems, especially when an unauthorized person obtains a user's personal information like a credit card number with the purpose of obtaining illicitly products or services. Accordingly, improved methods to protect the personal data of users and customers remain highly desirable.

BRIEF SUMMARY OF THE INVENTION

An encryption method to protect the identification constructs and account numbers constructs currently displayed on cards, like identification cards and credit cards, or on paper medium like hospital or bank statements, where these constructs are comprised of numbers, and/or characters, and/or symbols and where the encryption method works by replacing some of the elements comprising the construct with a special symbol(s) to avoid revealing the entire construct to unauthorized people and where the numbers and/or characters replaced by the special symbol(s) represent the personal identification number (PIN) associated with the construct. The method is designed to be utilized by issuers of cards like hospitals, governments and banks, and used as a process to protect the account constructs of cardholders as well as account statements printed on paper medium. To provide the entire construct, the user simply replaces the special symbol(s) with his assigned PIN. Accordingly, a person without the PIN, will not be able to complete the account/identification construct.

As an example, current credit cards are depicting the entire 16-Digits account number of the cardholder. After the adoption of this method, the card will no longer depict the entire account number because some of the digits will be replaced with a special symbol like an "X". These replaced digits also represent the customer's Personal Identification Number (PIN).

Thus, when the user starts interfacing with a retailer's website to buy a product or a service, the user completes his/her credit card number by replacing (in sequence) the "X" symbols on the credit card with his/her PIN.

The method is designed to assign a PIN to a user or a customer (cardholder) and for the cards and printed documents to have some blocked elements (e.g. digits, characters or symbols) of the identification or account construct and for a cardholder to be able to complete the documents' identification constructs with the use of his/her PIN.

The method is therefore comprised of cards or printed documents that do not depict the entirety of account or identification constructs, the PINs assigned to users and customers, computer/network system(s), a database, and a supporting application software(s) to process the data entered by users/customers. The method can also be used in portable computing devices, such as a laptop, tablet, iPad, cellular telephone, or the like.

The method provides an additional security authentication layer by assigning the user/customer with an account/identification construct that is not depicted in its entirety on documents and cards and only the PIN, which is known the customer/user is capable to complete the identification or account construct. For example, if a credit cardholder loses his/her credit card, and an unauthorized user finds the credit card, since the identification number is incomplete and the unauthorized user does not know the PIN of the cardholder, the unauthorized person will be prevented by the method from utilizing the credit card.

BRIEF DESCRIPTION OF THE SEVERAL VIEWS OF THE DRAWINGS

Not Applicable

DETAILED DESCRIPTION OF THE INVENTION

The following description of the embodiments of the invention is not intended to limit the invention to these mentioned embodiments, but rather to enable any person skilled in the art to make and use this invention. The embodiment of the invention includes, but is not limited, to a method that depicts identification constructs or data on credit cards, identification cards and printed documents. The subject matter disclosed is capable of considerable modification, alteration, and equivalents in form and function, as will occur to one having ordinary skill in the art and the benefit of this disclosure and it is to be accorded the widest scope consistent with the principles and features disclosed herein.

The invention is an encryption method to protect the identification constructs and/or account numbers currently seeing integrated on cards, like identification cards and credit cards, or on paper medium like hospital or bank statements, where these constructs are comprised of numbers, and/or characters, and/or symbols and where the encryption method works by replacing some of the elements comprising the construct with a special symbol(s) to avoid revealing the entire construct to unauthorized people and where the numbers and/or characters replaced by the special symbol(s) represent the personal identification number (PIN) associated with the construct. The method is designed to be utilized by issuers of cards like hospitals, governments and banks, and used as a process to protect cardholders account information or account statements printed on paper medium. To provide the entire construct, the user simply replaces the special symbol(s) with his assigned PIN. Accordingly, a person without the PIN, will not be able to complete the account/identification construct.

The method is designed to assign a PIN to a user or a customer and for the cards and printed documents to have some blocked elements (e.g. digits, characters or symbols) of the identification or account construct (e.g. account number).

The method is therefore comprised of cards or printed documents that do not depict the entirety of identification or account constructs, the PINs assigned to users and customers, a computer/network system, a database, and a supporting application software to process the data entered by users/customers.

To implement the method, the card issuer or document provider will create account or identification numbers (constructs) and they will require their customers/users to pick a set of numbers and/or characters within these new issued identification or account constructs to become and represent their new PINs. The exact position as well as the numbers and/or characters picked by the customer within his/her account or identification constructs will be blocked and not depicted on future printed documents or the credit or identification cards.

When the user is ready to use his identification construct or credit card number, the user simply replaces the special symbol(s) with his assigned PIN. Accordingly, only a person with the PIN, will be able to complete the account/identification construct and use it.

As an example, and without limiting the invention, when a customer is initiating a computer/network interface with a digital retailer to buy a product, the customer uses his/her PIN to complete the account/identification construct, then the customer uses an entry apparatus device (e.g. Computer Keyboard) to enter his/her completed account construct to complete the transaction with the online retailer.

SEQUENCE LISTING

Not Applicable

I claim:

1. An encryption method for concealing elements of a credit card account number comprising: receiving a request to acquire a credit card from a customer by a credit card issuer, wherein the credit card issuer processes the request of said customer to acquire a credit card;

approving the customer's request for a credit card, wherein the credit card issuer reviews the request for the credit card provided by the customer; creating an account construct for the customer by the credit card issuer, wherein said account construct is assigned to the credit card to be provided to the customer; selecting elements of the said account construct by the customer or the credit card issuer, wherein the selected elements of the said account construct are replaced with special symbols or images selected by the customer or card issuer to avoid displaying the complete account construct on the said credit card; assigning the selected elements of said account construct as a Personal Identification Number to said customer, and wherein the special symbols or images that replaced the alpha numeric elements of the account construct also represent the said Personal Identification Number; creating said credit card by the credit card issuer, wherein the credit card displays an incomplete account construct as the elements of the said account construct representing the customer's Personal Identification Number are replaced with symbols or images; providing the said created credit card to the customer, converting said customer into a cardholder; decrypting the incomplete account construct displayed on said credit card by the cardholder when performing an online financial transaction, wherein the cardholder utilizes the digits or characters comprising said Personal Identification Number to replace the symbols or images displayed on said credit card to complete the credit card account construct;

receiving, by a central processing system, from a computing device operated by the cardholder during performance of the online financial transaction with a business organization, an authorization request for the online financial transaction initiated by the cardholder utilizing the complete credit card account construct, wherein said authorization request includes entering of the complete credit card account construct, and wherein said central processing system is positioned in a communication path between any number of business organizations and the credit card issuer to communicate therewith; determining, by said central processing system, whether the credit card account construct contains all the elements comprising said account construct; transmitting, by said central processing system, a message to the credit card issuer, the message including original transaction details; receiving, by said central processing system, an authorization message from said credit card issuer, the authorization message indicating that the credit card has been authorized for the requested online financial transaction; receiving, by said business organization, the authorization message from said central processing system, the authorization message indicating that the credit card has been authorized for said requested online financial transaction.

2. The encryption method of claim 1, wherein the request for the credit card comprises at least one of the cardholder name, address, phone number, social security number, date of birth, income, bank account information, investment information, home rental information, and mortgage information.

3. The encryption method of claim 1, wherein the original transaction details comprises at least one of the cardholder name, address, or price of services, price of products, merchant information, business information, and complete information of the credit card including the complete credit card account construct.

* * * * *